United States Patent [19]
Aberson

[11] Patent Number: 5,732,193
[45] Date of Patent: Mar. 24, 1998

[54] METHOD AND APPARATUS FOR BEHAVIORISTIC-FORMAT CODING OF QUANTITATIVE RESOURCE DATA/ DISTRIBUTED AUTOMATION PROTOCOL

[76] Inventor: Michael Aberson, Rehov Brener 22/1, Haifa, Israel, 32546

[21] Appl. No.: 375,728

[22] Filed: Jan. 20, 1995

Related U.S. Application Data

[63] Continuation-in-part of Ser. No. 946,093, Sep. 17, 1992, abandoned.

[30] Foreign Application Priority Data

| Jan. 26, 1909 | [IL] | Israel | 100767 |
| Feb. 12, 1992 | [IL] | Israel | 100933 |
| Feb. 12, 1992 | [IL] | Israel | 100934 |

[51] Int. Cl.$^6$ .............................. G06F 15/00; G06G 7/00
[52] U.S. Cl. ...................... 395/10; 395/915; 364/474.16; 364/575
[58] Field of Search ................ 395/10, 915; 364/474.16, 364/575; 340/825.06

[56] References Cited

U.S. PATENT DOCUMENTS

| 3,891,836 | 6/1975 | Lee | 235/151.12 |
| 4,120,031 | 10/1978 | Kincheloe et al. | 364/464 |
| 4,511,979 | 4/1985 | Amirante | 364/481 |
| 4,670,713 | 6/1987 | Scheib | 324/103 |

OTHER PUBLICATIONS

Rose, C.L. "Transmission Line Loss Meter", Sep. 1967.
Peterson, James R. "Reflex Net: A real–time communication network for distributed control applications." Proceedings IECON '86. pp. 721–726, Sep. 29, 1986.

*Primary Examiner*—Tariq R. Hafiz
*Assistant Examiner*—Jason W. Rhodes
*Attorney, Agent, or Firm*—Edward Langer

[57] ABSTRACT

A method for behavioristic-format coding of quantitative resource data for control, planning and communication purposes in line businesses, utilities, etc. An individual coding unit can be used in a specific real-time object-oriented behavioristic control loop, and provide coherent, flexible data for control, planning, budgeting and forecasting, using a digital Tough Stochastic Decomposition (TSD) principle as the general behavioristic method. In accordance with the TSD method, the input raw data is converted in a standard rectangular digital matrix format, in which the 24-hour calendar day is divided into four 6-hour intervals. The coding apparatus is connected to primary instrumentation and provides total distributed raw data group coding, in non-programmable fashion, providing four digital-coded numbers a day, as four time history files. The coding apparatus digital output provides data packets for a distributed automation protocol over a data highway to a plurality of computing stations, where the behavioristic-format coded data is available for analysis and object-oriented programming using classic procedures such as regression and simplex optimization. The coding apparatus is also usable in local process control applications, including electrical energy demand and loss minimization. In addition, a load-leveling approximation and individual energy conservation technique is achieved via a new matrix game billing format.

12 Claims, 17 Drawing Sheets

| PARAMETER: (E.G. KG, ETC.) | | | | |
|---|---|---|---|---|
| INSTRUMENT: (E.G. SCALES N $\underline{0}$ ) | | | | |
| CALENDAR UNITS | 4 DATA FILES (6-HOUR) | | | |
| | 0 ① 6 | 6 ② 12 | 12 ③ 18 | 18 ④ 24 |
| | BLUE | WHITE | GRAY | ROSE |
| 1st | $1n_1$ | $1n_2$ | $1n_3$ | $1n_4$ |
| 2nd | $2n_1$ | $2n_2$ | $2n_3$ | $2n_4$ |
| | | | | |
| (K-1) | $(K-1)n_1$ | $(K-1)n_2$ | $(K-1)n_3$ | $(K-1)n_4$ |
| K | $Kn_1$ | $Kn_2$ | $Kn_3$ | $Kn_4$ |
| $\sum_{1}^{K} n$ | $N_1$ | $N_2$ | $N_3$ | $N_4$ |

FIG.5

EXAMPLE OF NEW (MOTIVATED) BILLING FORMAT
(TWO STRATEGIES FIELD:"GAME MATRIX")

| | | PLAYER A: SUPPLY-SIDE 4-COLOR TARIFF GAME (SEASONAL) | | | |
|---|---|---|---|---|---|
| | | 1/BLUE | 2/WHITE | 3/GRAY | 4/ROSE |
| PLAYER B: USER-SIDE 4-COLOR DEMAND GAME (WEEK) | CALENDAR UNITS ↓ | $r_1$ | $r_2$ | $r_3$ | $r_4$ |
| | E.G. 1 WEEK | $1D_1 \times r_1$ | $1D_2 \times r_2$ | $1D_3 \times r_3$ | $1D_4 \times r_4$ |
| | 2 WEEK | $2D_1 \times r_1$ | $2D_2 \times r_2$ | $2D_3 \times r_3$ | $2D_4 \times r_4$ |
| | 3 WEEK | $3D_1 \times r_1$ | $3D_2 \times r_2$ | $3D_3 \times r_3$ | $3D_4 \times r_4$ |
| | 4 WEEK | $4D_1 \times r_1$ | $4D_2 \times r_2$ | $4D_3 \times r_3$ | $4D_4 \times r_4$ |
| | 5 WEEK | $5D_1 \times r_1$ | $5D_2 \times r_2$ | $5D_3 \times r_3$ | $5D_4 \times r_4$ |
| | n WEEK | $nD_1 \times r_1$ | $nD_2 \times r_2$ | $nD_3 \times r_3$ | $nD_4 \times r_4$ |
| | $\Sigma_n$ | $1D_n \times r_1$ | $2D_n \times r_2$ | $3D_n \times r_3$ | $4D_n \times r_4$ |

BILLING (CURRENT RESULT)
(D ÷ RESOURCES DATA, E.G., KWHR, KG, LITRE, ETC.)
(r - MONEY RATES PER KWHR, LITRE, ETC.)

FIG.8A

EXAMPLE OF NEW (MOTIVATED) BILLING FORMAT

| | | PLAYER A: SUPPLY-SIDE 4-COLOR TARIFF GAME (SEASONAL) | | | |
|---|---|---|---|---|---|
| | | 1/BLUE | 2/WHITE | 3/GRAY | 4/ROSE |
| PLAYER B: USER-SIDE 4-COLOR DEMAND GAME (WEEK) | CALENDAR UNITS ↓ | $r_1$ | $r_2$ | $r_3$ | $r_4$ |
| | E.G. 1 WEEK | $1D_1 \times r_1$ | $1D_2 \times r_2$ | $1D_3 \times r_3$ | $1D_4 \times r_4$ |
| | 2 WEEK | $2D_1 \times r_1$ | $2D_2 \times r_2$ | $2D_3 \times r_3$ | $2D_4 \times r_4$ |
| | 3 WEEK | $3D_1 \times r_1$ | $3D_2 \times r_2$ | $3D_3 \times r_3$ | $3D_4 \times r_4$ |
| | 4 WEEK | $4D_1 \times r_1$ | $4D_2 \times r_2$ | $4D_3 \times r_3$ | $4D_4 \times r_4$ |
| | 5 WEEK | $5D_1 \times r_1$ | $5D_2 \times r_2$ | $5D_3 \times r_3$ | $5D_4 \times r_4$ |
| | n WEEK | $nD_1 \times r_1$ | $nD_2 \times r_2$ | $nD_3 \times r_3$ | $nD_4 \times r_4$ |
| | $\Sigma_n$ | $1D_n \times r_1$ | $2D_n \times r_2$ | $3D_n \times r_3$ | $4D_n \times r_4$ |

BILLING (CURRENT RESULT)
(D ÷ RESOURCES DATA, E.G., KWHR, KG, LITRE, ETC.)
(r − MONEY RATES PER KWHR, LITRE, ETC.)

FIG.8B

METHOD AND APPARATUS FOR BEHAVIORISTIC-FORMAT CODING OF QUANTITATIVE RESOURCE DATA/ DISTRIBUTED AUTOMATION PROTOCOL

CROSS-REFERENCE TO RELATED APPLICATIONS

The present application is a continuation-in-part of U.S. patent application Ser. No. 07/946,093, filed Sep. 17, 1992 by the same inventor, entitled METHOD AND CONTROL APPARATUS FOR QUANTITATIVE RESOURCE DATA/ DISTRIBUTED AUTOMATION PROTOCOL, now abandoned.

FIELD OF THE INVENTION

The present invention relates to information technology (control, planning and communication) including instrumentation and data coding methods and apparatus, and more specifically, to an apparatus for providing periodical control signals, and time history files in a standard protocol containing measured quantitative resource data within predetermined time intervals based on a behavioristic-format coding technique, using a digital tough stochastic decomposition (TSD) principle.

BACKGROUND OF THE INVENTION

The basic purposes of conventional up-to-date resource metrology/data acquisition and processing methods usually are:

1) to sample and evaluate output values from original sensors/counters/meters; and
2) to provide calculations and data used for control, planning purposes which may be provided as a PC with console devices and various local architectures.

The pressure of competition has driven an increasing trend to improve efficiency in production and service industries. Thus, metrology has become an increasingly important tool, and yet there remains a wide gap between up-to-date and sophisticated instrumentation and out-of-date metrology-based methods.

There are many steady-state scales, counters, meters, cash registers, etc. with static presentation of quantitative SI-basic and derived units. This raw data is often used by personal computers or workstations, in an attempt to aid personnel in developing operating strategies.

Generally, macroeconomic business units operate on a 24 hour-a-day basis, with different behavioristic intensity of process variables measured during a calendar day. These variables typically show operational peaks and valleys, e.g., electrical energy demand over the course of a day. The intensity is a time-dependent function which has a non-symmetrical character, the so-called "life line", as discussed in the text "Public Utility Economics", Michael A. Crew et al., St. Martins's Press, (1979) p. 197.

The non-symmetrical character of the process variable intensity can be described as a stochastic process, i.e., a random process occurring along a time line. These processes and their economic implications are discussed in the texts, "The Econometric Analysis of Time Series", Andrew C. Harvey, Simon and Schuster (1981) Second Ed., and in "Handbook of Budgeting", H. W. Allen Sweeny et al., John Wiley and Sons (1987), Second Ed.

The most advanced example in this field are electric utilities, which base their industrial tariff rates only, mainly on a time-of-use (TOU) method, with steady-state meters for developing "life-line" tariffs based on individual time intervals within a calendar day. The difficulties here are in comparison of the benefits and costs, to standardize supply and demand management. As a rule, other industries generally don't use metering in a behavioristic approach to tariff rate adjustment.

The prior art includes electric utility apparatus for metering and data acquisition. In U.S. Pat. No. 4,794,369 to Haferd, an electricity metering transducer is disclosed which converts sampled electricity quantities to digital form and provides a substantially nonsynchronous sampling signal. In U.S. Pat. No. 4,511,979 to Amirante, there is disclosed an electric energy meter for measuring various parameters of electrical energy consumption during time differentiated billing periods. A time of use (TOU) register for an electronic watthour meter is disclosed in U.S. Pat. No. 5,066,906 to Moore.

In U.S. Pat. No. 4,689,615 to Rosso, there is disclosed a visual display of the trend of a data source, using a bar-graph and digital display controlled and analyzed by a computer system. Examples of data acquisition systems include those disclosed in U.S. Pat. Nos. 4,451,826 and 4,196,417 to Fasching, in which a plurality of remote stations are scanned over a single cable.

In U.S. Pat. No. 4,670,713 to Scheib, there is disclosed a power usage regulation system, using a closed loop control system in which a calculated correction value is converted into a bias signal which can be used for turbine regulation to control power generation, by use of an operator-selected base value. The Scheib system has no AC frequency parameter for synchronization.

In U.S. Pat. No. 4,120,031 to Kincheloe et al, there is disclosed a desktop apparatus for displaying power usage data of perdetermined individual time periods, for customer power usage individual decision-making.

In U.S. Pat. No. 4,201,980 to Friedman et al, there is disclosed an apparatus for converting raw data into a group-coded recording (GCR) data format and for controlling the recording of GCR data on magnetic tape.

As stated above, the current approach to resource data management involves centralized data processing, with data presentation in too many time-of-use intervals or in a completely static format. The centralized data processing and static data presentation approaches place limitations on the effectiveness of standard data management using real-time object-oriented data processing and a general communication interface (protocol).

As is known, computer systems generate volumes of data, but general software is needed to convert the raw data into useful information for process control and planning. In the paper by D. Romanchik, Test and Measurement World, Feb. 15, 1994, pp, 22–24, "What do you do with all that data?", it is stated that real-time performance is most important, and therefore the software must be fast enough to simultaneously collect and process the data to provide meaningful results.

The problems with software are complicated by the fact that vendors use a data format and communication protocol best suited to their own devices. As a consequence, devices supplied by different manufacturers are unable to communicate with one another, or special gateways must be developed. Solutions to this interconnectivity problem are costly, creating a budget burden. The US utility industry's operating costs for communications ranges from $2–5 billion/year and this grows 25% annually. Utilities have a need for flexibility that comes with common data ports and common communication protocols. Distribution automation systems must be updated to bridge the gap between real-time data acquisition systems and existing databases. Thus, it is concluded in the paper entitled "An International Computer Protocol Standard is Essential", J. Marks, Power Engineering, Feb. 1994, pp.36–37, that "the development of an international communication protocol would therefore help all electric utilities".

It would therefore be desirable to provide a quantitative resource data acquisition and coding system, to maximize the economic usefulness of quantitative resource data for control, planning and communication purposes in industry.

SUMMARY OF THE INVENTION

Accordingly, it is a principal object of the present invention to overcome the above-mentioned disadvantages of existing data processing systems and provide a coding apparatus and method for behavioristic-format coding of quantitative resource data for automatic process control, planning and communication purposes.

In accordance with the present invention, there is provided a method for automatically controlling a process in accordance with digital control signals produced as output by a controller, wherein the controller is responsive to behavioristic-format coded input data supplied by a coding apparatus which acquires raw, quantitative resource data measured by primary instrumentation, said method comprising the steps of:

defining, in said coding apparatus, four 6-hour time intervals corresponding to periods of a 24-hour calendar day;

inputting the instrumentation-measured raw, quantitative resource data as discrete digital values into a summing means in said coding apparatus;

disjointly summing said discrete digital values of the raw, instrumentation-measured quantitative resource data occurring during said intervals;

storing said summed discrete digital values of quantitative resource data associated with each of said defined four 6-hour time intervals, as four digital-coded numbers a day;

providing said four digital-coded numbers to said controller for producing, via arithmetic and logic manipulation, said digital control signals; and performing automatic process control in accordance with said digital control signals.

The inventive coding apparatus can be provided as a distributed, dedicated non-programmable coding unit, producing a coherent, digital protocol using resource data for behavioristic-based control, planning and communication purposes.

The apparatus can be used in a special behavioristic-based control loop, to provide flexible data for control, planning, budgeting and forecasting, using four digital parameters a day, provided in a novel rectangular matrix data format. The novel data format is based on a Tough Stochastic Decomposition (TSD) principle, introduced here as a standard behavioristic basis for the invention.

The essence of the inventive behavioristic approach is datamation of events in time, based on specific format of past knowledge. The use of data for control, planning and communication purposes is demonstrated herein via practical process applications of a supply-demand matrix game. As stated in the classical text by N. Wiener, "Human Use of Human Beings—Cybernetic and Society", Hougton Mifflin, 5th ed. (1971),pp. 48, "the automatic machines make decisions on the basis in the past: two alternatives, such as the closing or opening of a switch" (two-position on-off control, M.A.); pp. 277, "there is no limit to the extent to which our society can improve its functioning by learning from the consequences of its previous behavior".

The coding apparatus is connected to each and every primary digital sensor, counter or metering instrument in the process, and provides total distributed raw data four-group coding, in non-programmable fashion. The result is a new behavioristic protocol of TSD digital coded data.

The four-group coded data is provided in a standard flexible format by use of the TSD principle, in which the 24 hour calendar day is divided into four behavioristic periods: four 6-hour intervals. The data is presented in a rectangular matrix as serial time history files corresponding to these intervals. The four time history files, corresponding to four numbers on every calendar day, can be used as data output.

The data output is ready for on-line local control, strategic decision-making, programming and planning purposes in a behavioristic standard protocol.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIG. 5 is a data printout in rectangular matrix format representing the time history file data provided as the coding apparatus output, in a TSD format for resource data presentation;

FIGS. 8a–b are examples of a data printout "matrix game" format for process control and new (motivated) billing practice;

DETAILED DESCRIPTION OF A PREFERRED EMBODIMENT

Figure 1A:
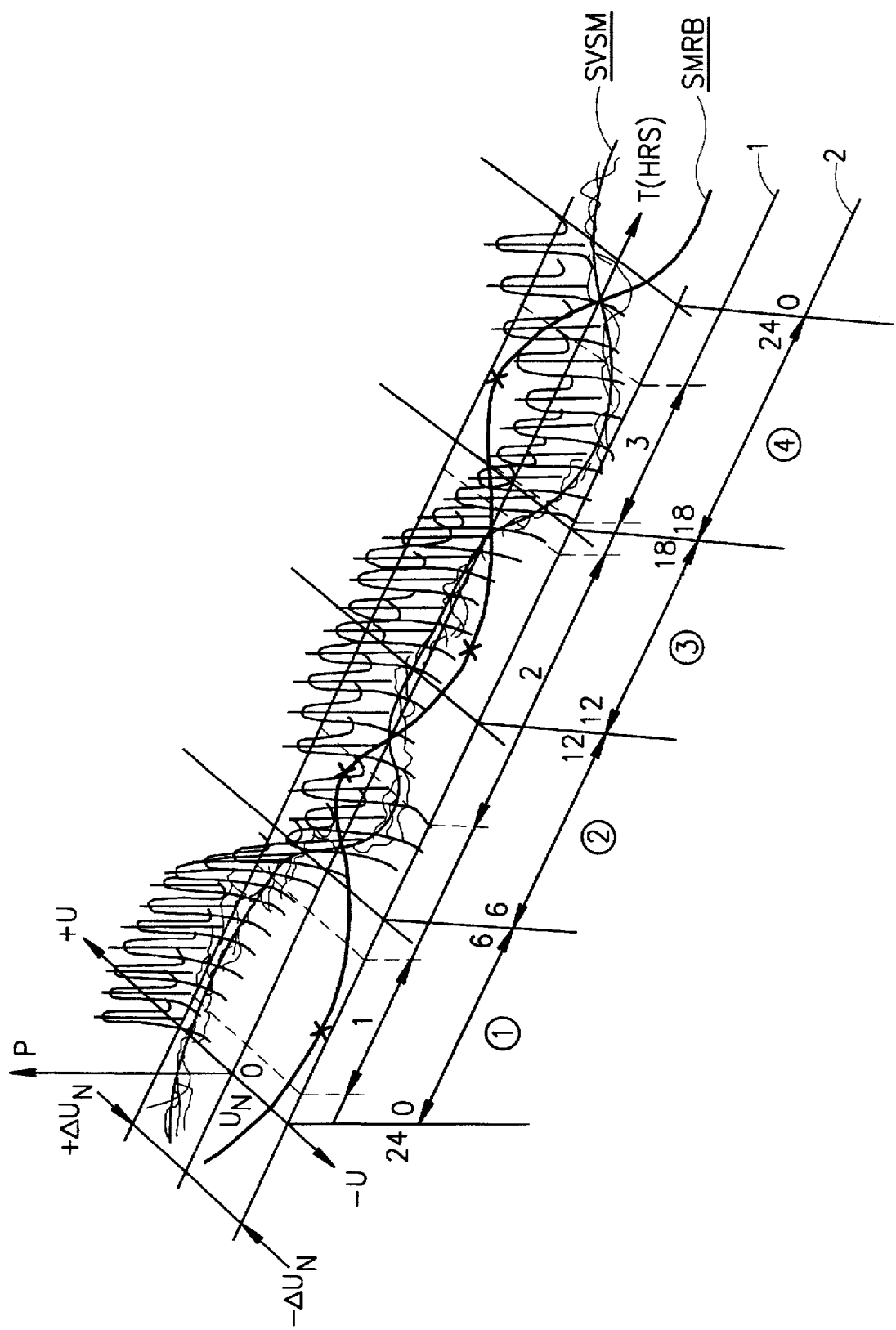
FIG. 1a is a graphic stochastic diagram of a 3-D Statistical Model of Rational Behavior (SMRB) and a Tough Stochastic Decomposition (TSD) principle, in accordance with the present invention.

Referring now to FIG. 1a, there is illustrated a 3-D Statistical Model of Rational Behavior (SMRB) based on its mirror conform, an AC Service Voltage Stochastic Model (SVSM). This graph displays the time-based behavior of an AC service voltage function which conforms to the rational activity of an aggregate of consumers. It is a general disclosure of the TSD principle, providing the conceptual background of the invention. The original reference to a 3-D (Time-Utility-Probability) model for AC-SVSM is provided in a monograph by the inventor, M. Abetson, entitled "Voltage Control Optimization", Energy Publ. House, Moscow (1975), FIG. 3, p. 75.

The TSD principle based on SMRB can be used as an instrumental background for any measured resource or process data presentation in a standard discrete-linear digital format, i.e., in standard protocol digital packets. The TSD principle relates to each measured variable in a stable, recurrent process (utilities and other line businesses). As proved in the inventor's monograph referenced above, this model is essentially a time-dependent stochastic series, two-period low frequency process with four significant stable saddle points (marked "X"). It demonstrates the possibility of presenting the series either:

1) using three strict, stationary intervals (line 1); or
2) using four, discrete-linear, relative stochastic intervals, (line 2) having four saddle points (X). The inventor has recognized the second possibility as vital for simple datamation realization via the coding apparatus of the present invention.

It is known from classic works (Lagrange, Kuhn-Tacker), that a saddle point of any monotonous function means the existence of a local optimum (or maximum) in its vicinity, per the work entitled "Studies in linear and non-linear programming" K. Arrow et al, (1958), Stanford Univ., page 154, 159 and 172. This means that for the stochastic low-frequency process illustrated in FIG. 1a, it is possible to achieve a discrete-linear approximation with four equal 6-hour intervals, with each interval containing the discrete data for use in control, planning or communication purposes.

An important reference in this regard is given in the paper entitled "An Introduction to Probability and Stochastic Processes", by J. Melsa et al, Prentice-Hall (1973), p. 353, wherein it is stated: "Two interfaces between a physical problem and computational algorithms are of prime importance: a compromise between mathematical accuracy and computation convenience. When a digital computer is used to simulate the computational algorithms, the proper interpretation of the stochastic process is not trivial." Thus, the subtle idea incorporated in the present invention of four, 6-hour discrete data files daily as a behavioristic control loop is not trivial.

As shown in FIG. 1a, line 1 indicates three strict, stationary intervals, and line 2 indicates four 6-hour relative, stationary intervals, the latter being a convenient computation format, which is a breakthrough step to providing a standard digital datamation protocol for industrial data. Clearly, if the model of FIG. 1a would have three or five significant saddle points, but not four, this crucial step would be impossible, and the elementary discrete-linear interval would be 8 or 4.8 hours, but not 6 hours exactly (24/4=6).

The 6-hour elementary interval for computation is unknown in typical business scheduling and programing practice. Currently, the typical elementary time interval is equal to one hour for most utilities' short-term scheduling and computational practice (ELECTRA-CIGRE REPORT N106, 986, page 75).

Figure 2:
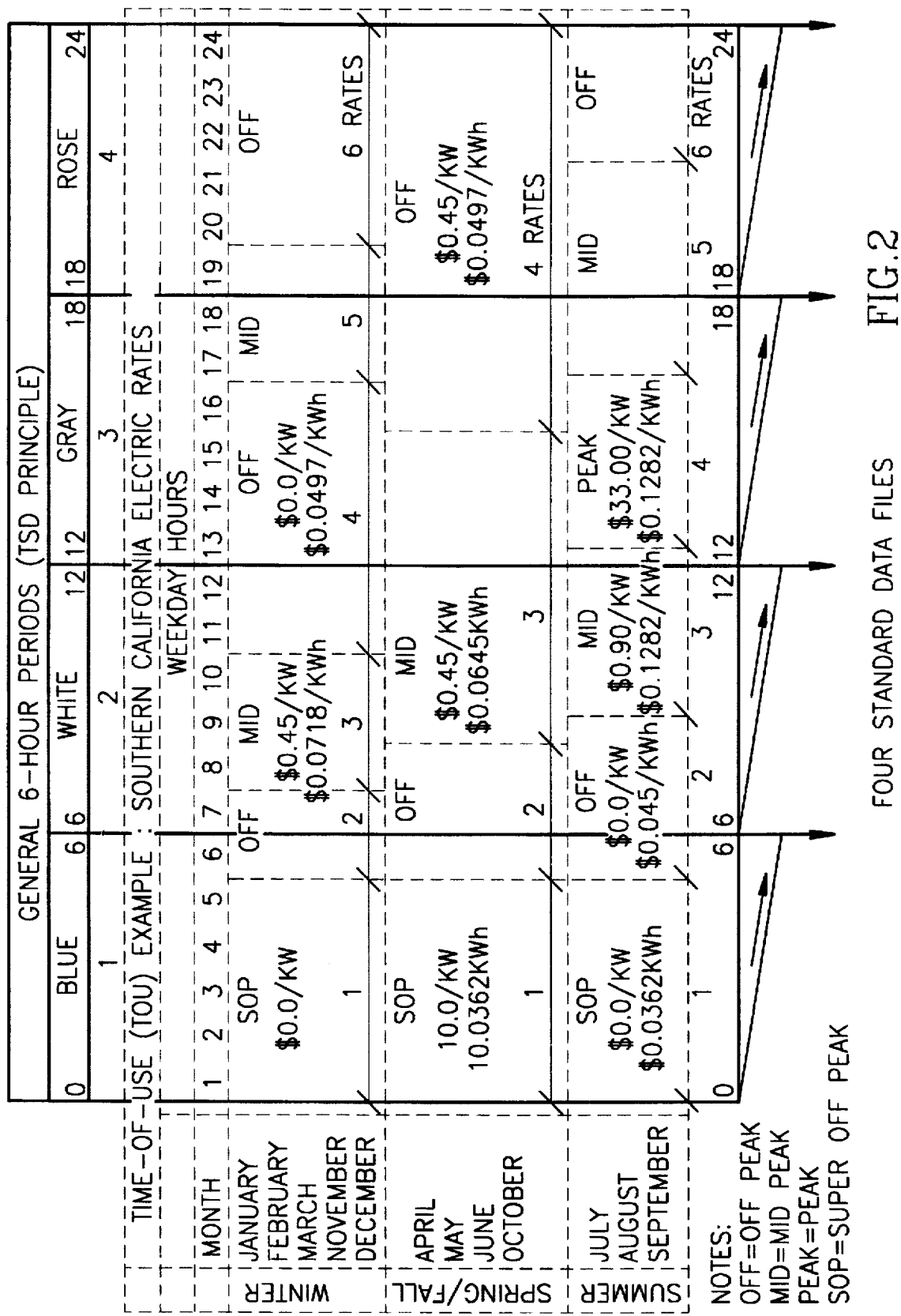
FIG. 2 illustrates the application of the TSD principle to the time-of-use (TOU) rate chart based on the commercial practice of an electric utility.

Thus, the TSD instrumental principle (four, 6-hour disjoint data intervals) is the long-awaited canonic solution with fundamental new potential, as shown in FIG. 2 and the examples of FIGS. 8–11. This solution achieves a standard data protocol for resources and processes using the behavioristic approach (SMRB), based on a statistical-economic study of a real, physical function (AC service voltage represents a stochastic process which provides a unique statistical medium).

Figure 1B:
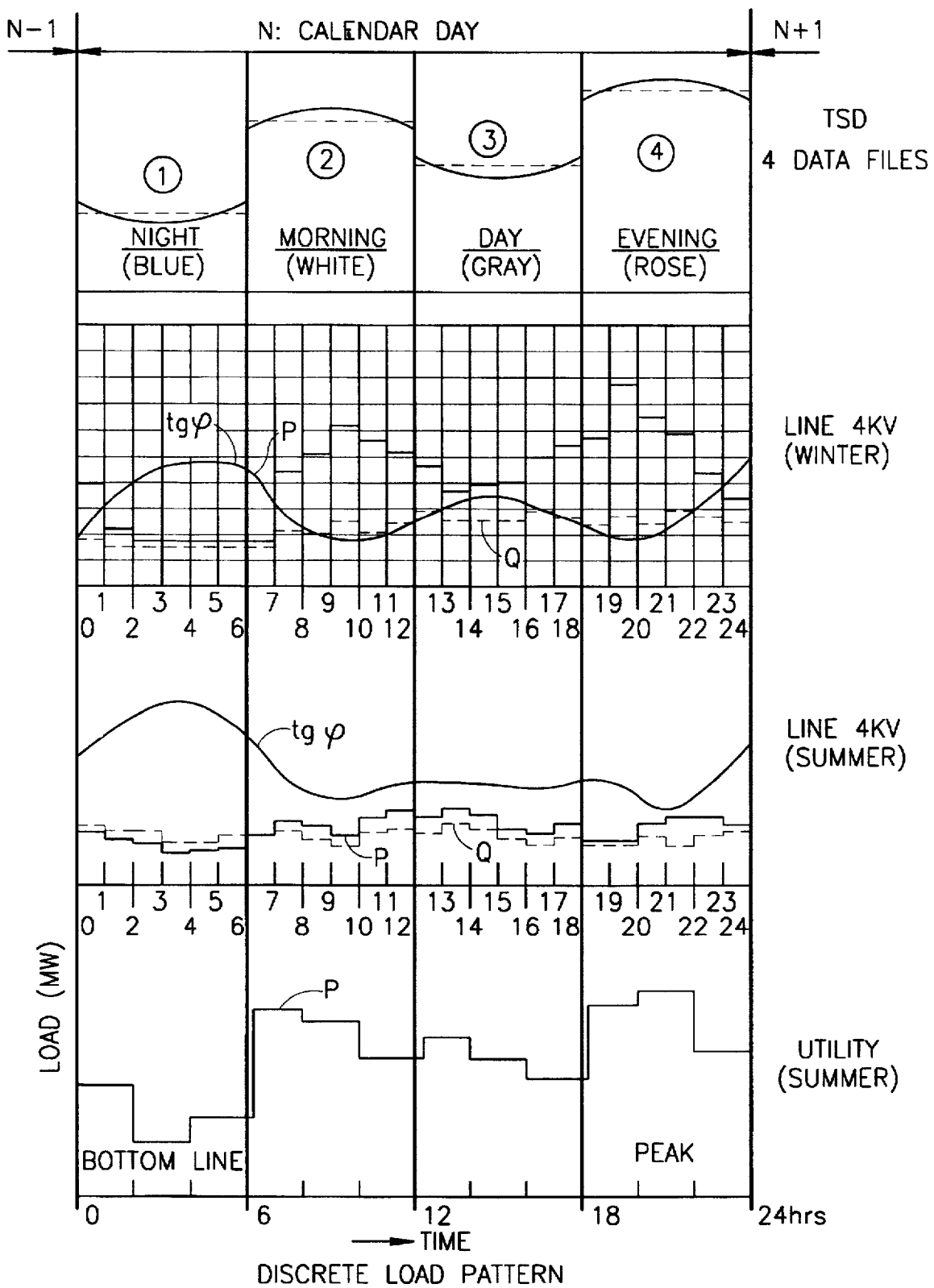
FIG. 1b illustrates an electric utility load pattern useful as an example in describing the TSD principle in accordance with the present invention.

Referring now to FIG. 1b, there are shown illustrations of an electric utility typical load pattern during a calendar day, shown as a MW load curve vs. hour of the day. In accordance with the TSD principle of the present invention, the heavy vertical lines indicate a transition from an elastic "life-line" electrical load pattern, into four discrete and equal 6-hour periods along the time axis. These periods correspond to four saddle points in the SMRB model, as shown in FIG. 1a, i.e., a standard approximation of human economic activity occurring in a cyclic fashion. Thus, in a TSD approximation of the calendar day, the raw resource data converts into a standard coherent and flexible behavioristic format.

The four discrete behavioristic time intervals may be represented by four colored areas (not shown in color):

1) blue: 00.00–06.00 (night)
2) white: 06.00–12.00 (morning)
3) gray: 12.00–18.00 (day)
4) rose: 18.00–24.00 (evening)

As shown and described further herein, the TSD principle allows for a full digital and standard flexible resource data presentation format using a rectangular matrix format. For instance, the classic problem of the power utility industry, that of "load leveling", can be solved radically using the TSD standard (6×4) "time-price signals" (see FIG. 8). Such a solution is not possible using the current, industrial customer time-of-use (TOU) approach, which does not relate to the residential consumer and which limits standardization in supply and demand side management.

The TSD principle has three main applications:

1) Control or Management—using TSD, the information system evolves from full central computer-oriented data processing to standard flexible process control automation or decision-making, with local and strategic periodical control using a rectangular matrix digital format;

2) Planning—TSD simplifies optimization of operation using two classic linear procedures which can be applied in real-time object-oriented fashion to each time history file, via regression and simplex programming for planning/budgeting/forecasting, requiring less computing machine time;

3) Data communication—TSD enables global hierarchical "hand shaking" protocol for communication via serial protocol packets from one business unit data base to another, with three key desirable features: coherence, flexibility, and integration.

In addition, TSD can simplify computer architecture from PC-based systems with individual hardware and software, and various "open" operation systems (DOS, UNIX, OS/2 etc.), to a high-speed unified special/business central computer connected to printer output, without console devices (display), complex operation systems, artificial languages, thus removing operator interference (which usually has a negative impact).

Referring now to FIG. 2, there is illustrated a TOU rate chart of an electric utility, which has been combined with a representation of the TSD principle, by division of the chart into four discrete and equal 6-hour intervals along the time axis, labeled as colored time history files (not shown in color).

The prior art of TOU tariff systems includes many examples, for use in utility supply systems such as electricity, telephone, gas, water, etc. These known TOU systems are empirical attempts to reflect the "life-line" of actual consumer usage, but they only demonstrate sophisticated elastic, but short-sighted local strategy since there is too much inherent flexibility, which prevents general, coherent protocol communication by computer networks.

In contrast, the present invention presents an approach which is based primarily on the use of four general time intervals and four local, application-specific tariff rates.

As shown in FIG. 2, a triangular data accumulation appears on every TSD file, and these are developed as a strict linear function of every process variable during the 6-hour summing procedure each day, in accordance with the TSD principle.

Figure 3:
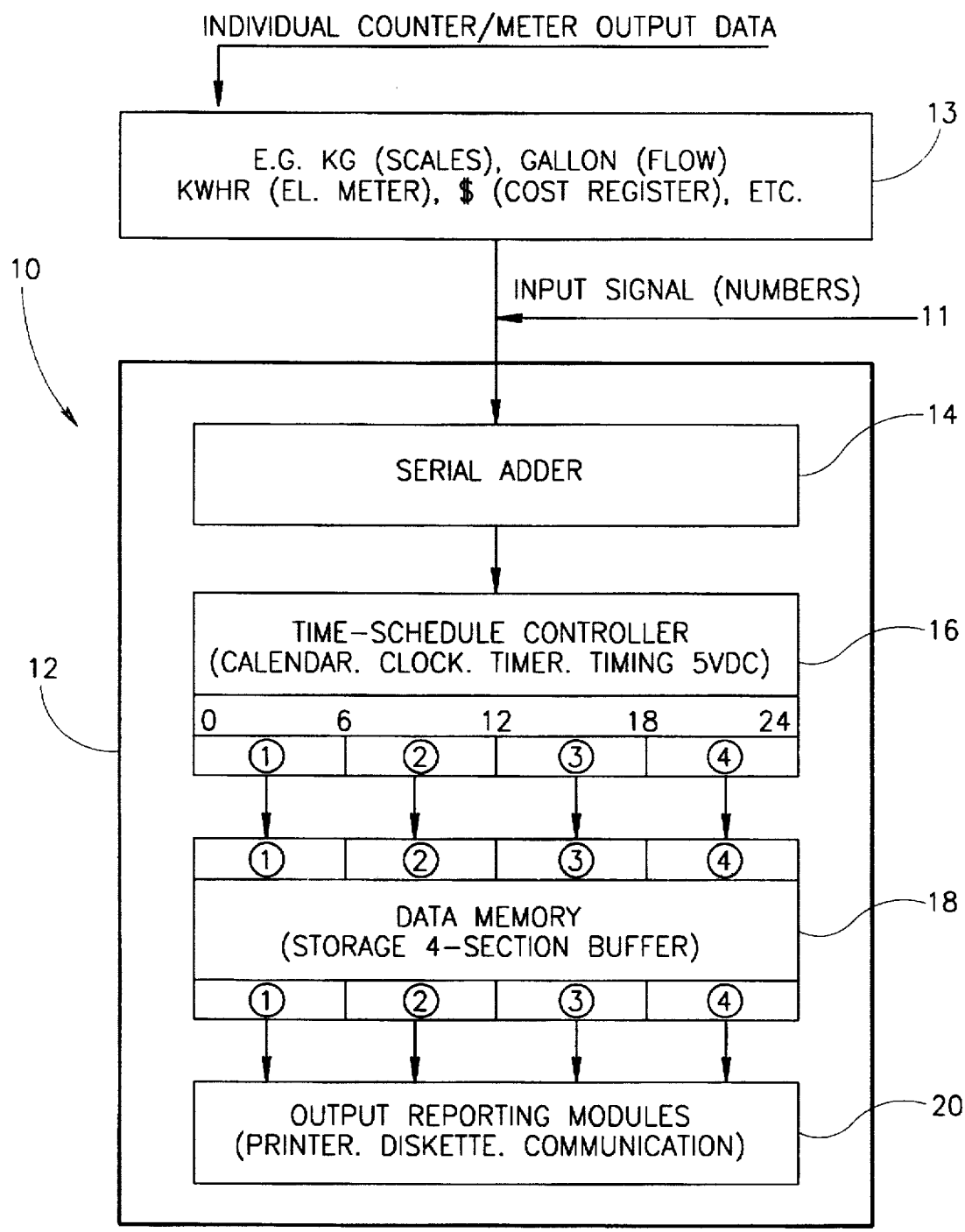
FIG. 3 is a block diagram of a preferred microprocessor-based embodiment of a quantitative resource data coding apparatus constructed and operated in accordance with the TSD principle of the present invention.

In FIG. 3, there is shown a block diagram of a quantitative resource data coding apparatus 10 constructed and operated in accordance with the principles of the present invention. Apparatus 10 comprises a data acquistion unit 12, which receives steady-state raw input data 11 from a primary instrumentation unit 13 containing a sensor, such as a counter, meter, scale, flowmeter, electric meter, etc. Input data 11 is fed to a serial adder 14 in data acquisition unit 12 of coding appparatus 10.

Serial adder 14 operates according to the inventive behavioristic-format coding technique, and sequentially sums the input data disjointly as it occurs at primary instrumentation 13 during every 6-hour interval of each calendar day, four times a day, providing a triangular data accumulation (FIG. 2) of coded data, for producing digital signals and time history files. The four predetermined intervals are defined by a time-schedule controller 16, comprising a calendar, clock, timer and 5 VDC power supply. The behavioristic time intervals constitute a digital rectangular matrix format and four time history files, defined as the hours 0.00–6.00, 6.00–12.00, 12.00–18.00, and 18.00–24.00. A storage buffer block 18 holds the summed input data in memory, in one of four disjointed file records. An output reporting block 20, comprising printer/diskette/ communication modules provides the output data in an output protocol in printed or recorded form. This output data, provided as four digital-coded numbers, is applied as described previously, i.e., for control, planning and communication.

Figure 4:
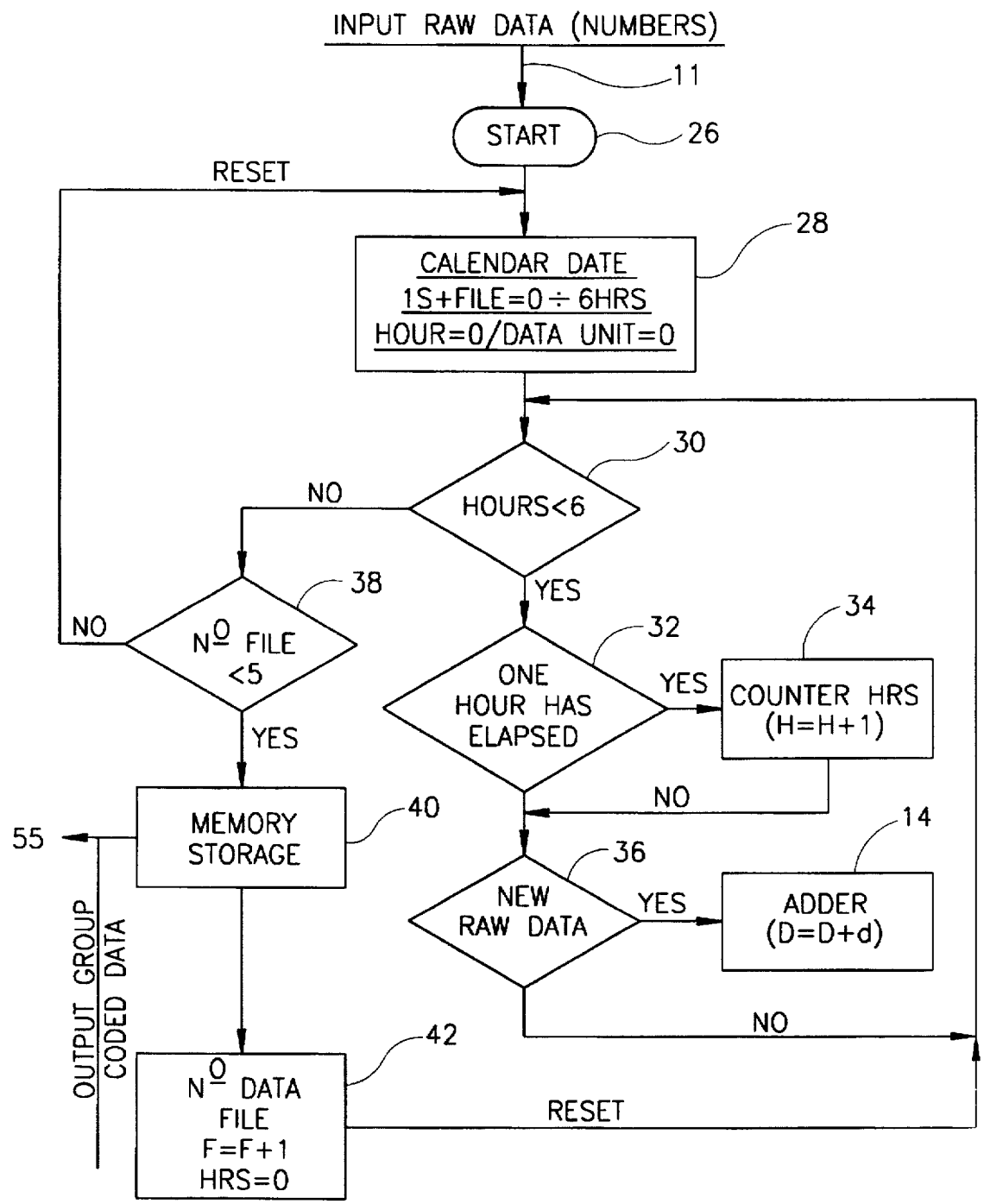
FIG. 4 is a flowchart illustrating the operation of the coding apparatus of FIG. 3 during data acquisition/presentation.

FIG. 4 is a flowchart illustrating the operation of data coding apparatus 10, in producing the rectangular matrix output data record. Via start block 26, raw input data 11 is fed to time schedule controller block 28, which associates the calendar and clock time of input data 11 (representing discrete values of quantitative resources) to a predetermined time interval, one of the four time history files, as per FIG. 5.

In block 30, the elapsed time is checked to determine if less than a 6 hour interval has passed. If so, block 32 checks to determine if a one hour interval has passed, in which case block 34 advances the counter by one hour. Whether or not one hour has passed, the new raw input data 11 is fed via block 36 to serial adder 14 where it is summed disjointly in a buffer 18.

If the elapsed time is greater than 6 hours, block 38 checks whether the time history file (Nfile) is less than five, since one calendar day is represented by four 6-hour intervals, and accordingly, four digital-coded numbers a day. If the time history file number is not less than five, the sequence is reset and the next calendar day input raw data 11 is received.

If the time history file is less than five, then block 40 supplies buffer 18 with the input data at a storage address register, for retrieval as output data in the form of four digital-coded numbers 55 a day. Once this is done, the time history file number is incremented in block 42, as cycle reset.

Control of the operation illustrated in FIG. 4 can be implemented by relay ladder logic and trigger switches using common commands, so that a non-programmable, standard design using standard software is achieved, in a dedicated microprocessor-based controller. The four digital-coded numbers 55 may be printed or recorded as time history files in different colors to avoid identification error, e.g., blue, white, gray and rose.

In FIG. 5, there is shown data printout in rectangular matrix format representing the TSD four digital-coded numbers 55 and time history file data provided as the coding apparatus 10 output. The format represents a four-group coded digital data rectangular matrix, available in printed or recorded form for local on-line control or planning purposes, or for use in a communication protocol.

Figure 6A:
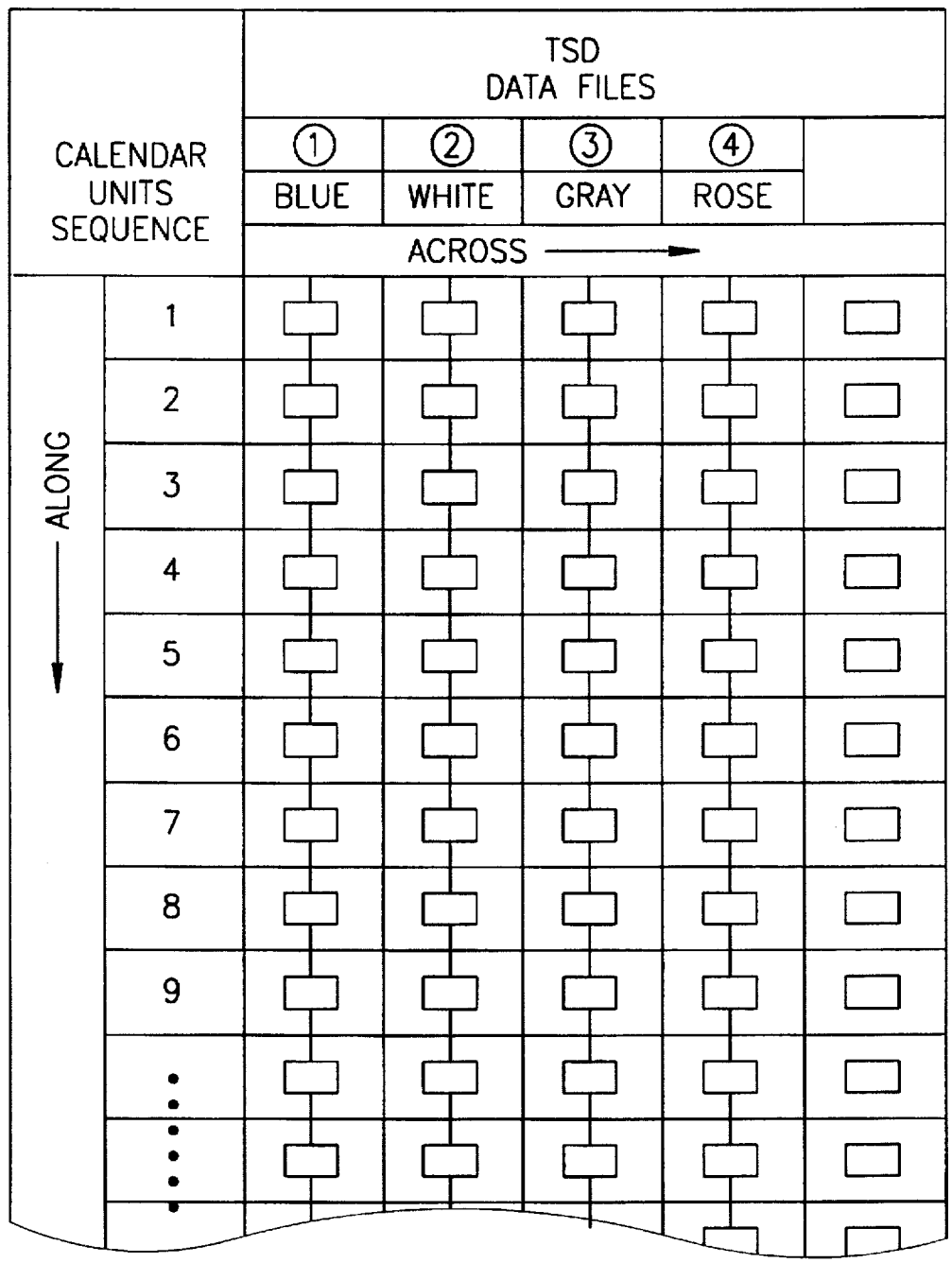
FIGS. 6a–b illustrate, respectively, elementary and complex rectangular matrix formats containing four time history files for TSD planning, programming, budgeting, and forecasting using linear discrete optimization techniques.
Figure 6B:
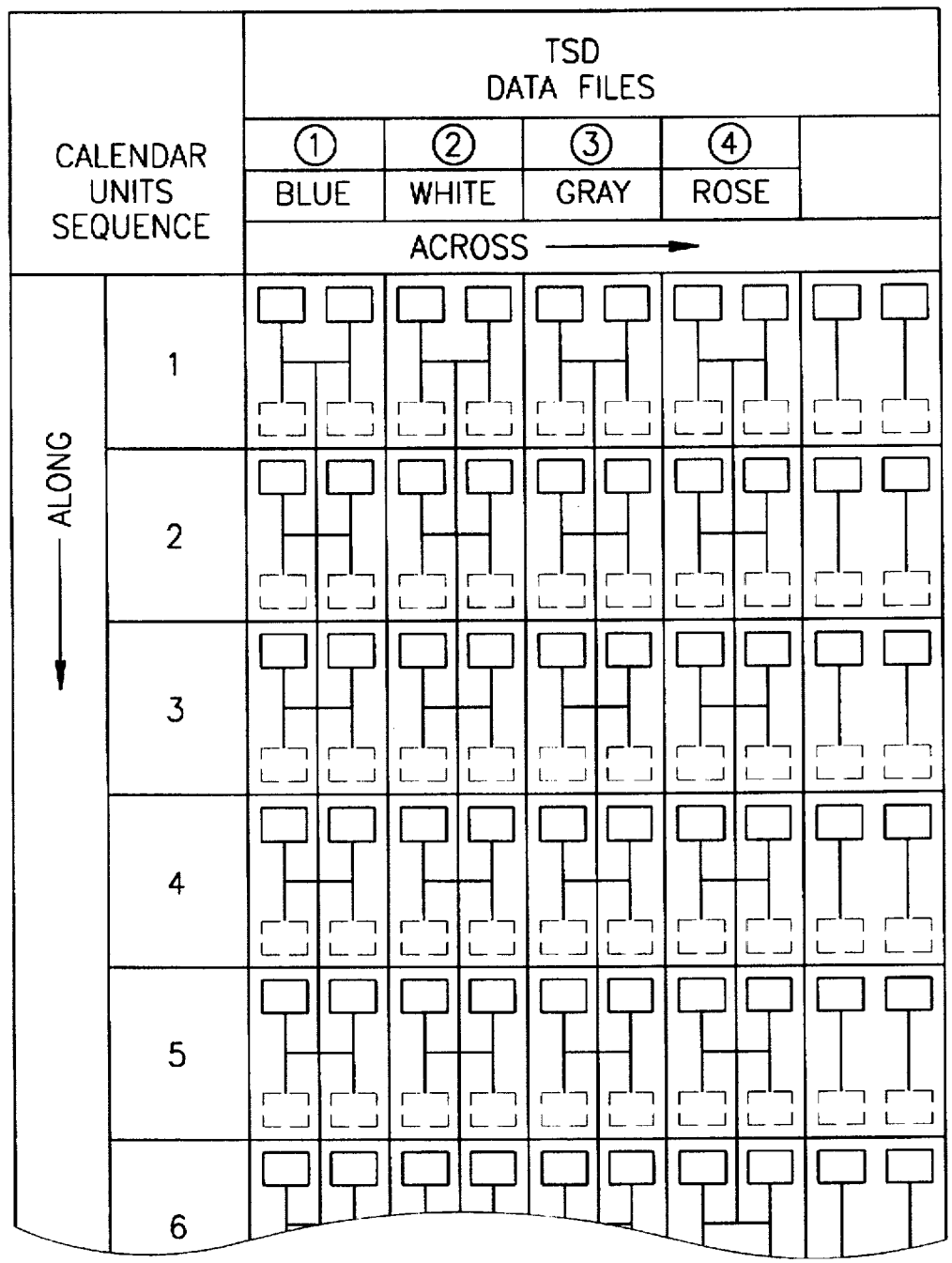

FIGS. 6a–b illustrate, respectively, elementary and complex rectangular matrix formats containing four time history files for TSD planning, programming, budgeting, and forecasting using linear discrete optimization techniques. Its linearity is based on the TSD principle approximation, due to four saddle points of the SMRB model. This TSD logical record provides a practical analytical tool for "along-across" flexible programming/optimization computing procedures—four TSD time history files for one individual parameter unit in the elementary matrix format of FIG. 6a, or several individual parameters/units in the complex matrix format of FIG. 6b (i.e., a random time series [time, x] or [time, x, y, z . . . ] in classic terms).

The rectangular matrix format of FIGS. 6a–b is a standard format for central computer storage record of resources data in individual units: kg, ton, $, kwHr, etc., each of which can be provided as preliminary data in accordance with the TSD principle. This behavioristic analytical format is a basic normalized form for three principal points in economic programming:

1) The data can be treated as points in a complete series representing the simplest form of exchange/elementary economic cells for a two-person game strategy;
2) The data can be an adequate computing base for object-oriented programming, for a special business computer system (without console display), instead of PC-oriented approach;
3) The data can be used in two classic linear optimization procedures: regression analysis and the simplex method for planning purposes. For TSD discrete linear optimization procedures, there are four standard object functions (per four saddle points, see FIG. 1a), intended to explain the stochastic process of individual variables or resource data. For example, over the course of a year divided into four quarters, these four object functions produce sixteen disjoint optimum points, or an optimal hypersurface. This approach provides behavioristic-flexible, discrete optimization possibilities in business planning, budgeting and forecasting.

Figure 7:
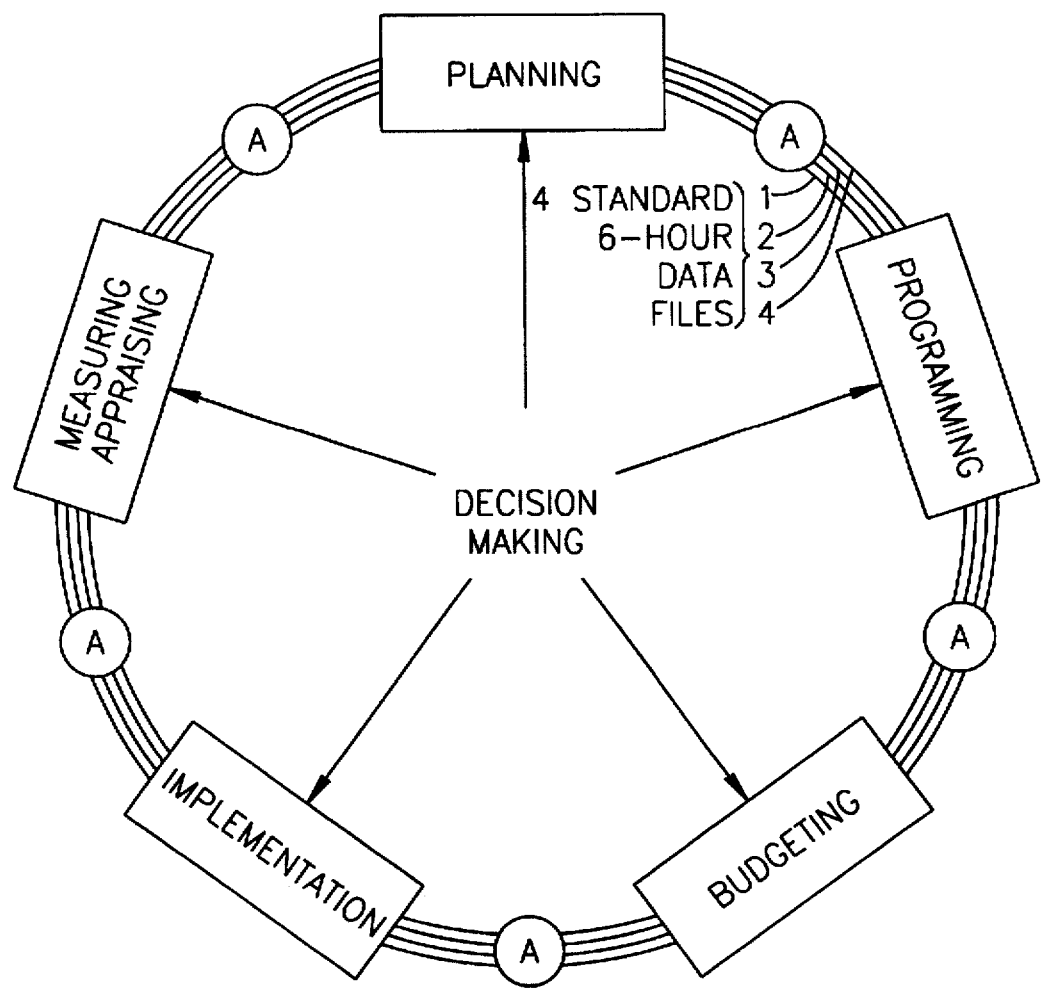
FIG. 7 is a schematic illustration of a business unit information system cycle using the TSD principle for standard flexible resource output data provided by the coding apparatus.

In FIG. 7, there is shown a schematic illustration of a business unit information system cycle using the TSD principle for standard flexible resource output data provided by coding apparatus 10. This approach may include use of a data highway on which quantitative resource data is transferable to various computer stations "A" for budgeting/planning/forecasting/analysis and decision-making in accordance with the digital TSD parameters. Advantages of this approach include: hierarchical hand-shaking protocol for line industries (production and service), from one business unit information cycle to a global computer database, in which three key facets of the protocol are: 1) standard coherence, 2) standard flexibility and 3) standard integration.

FIGS. 8a–b are data printout examples of a new billing format, providing cost information in accordance with a standard behavioristic protocol. FIGS. 8a–b present the FIG. 5 basic rectangular matrix color printout as a "matrix game" for two (supply-demand) independent player's commercial exchange strategies: Player A (supply-side) with four seasonal 6-hour tariff rates (r): and Player B (demand-side) with four 6-hour daily user demand (D).

The "matrix game" billing format with four colored files presents equal financial responses for two sides of exchange in a simple sufficient and flexible form. This format is the adequate response to an information-driven control system. As stated in the report by ELECTRA-CIGRE No. 123, 1989, p. 47. "the electricity tarriffs must provide the customers with a time-price signal to help them use load management with a view to reduce costs." The "matrix game" format meets this critical requirement for information-driven control: every customer/individual end user, for example, an electric utility user, learning via past knowledge (demand, tariff game) can choose his current strategy having four "trip-close" possibilities daily, exactly every six hours each day based on a "time-price signal" value (D×r), (manually or automatically), i.e., the customer can use load management with a view to reduce costs, in electric energy (gas, water) consumption. This mass, standardardized procedure can be named BDSM (behavioristic demand-side management).

Figure 9A:
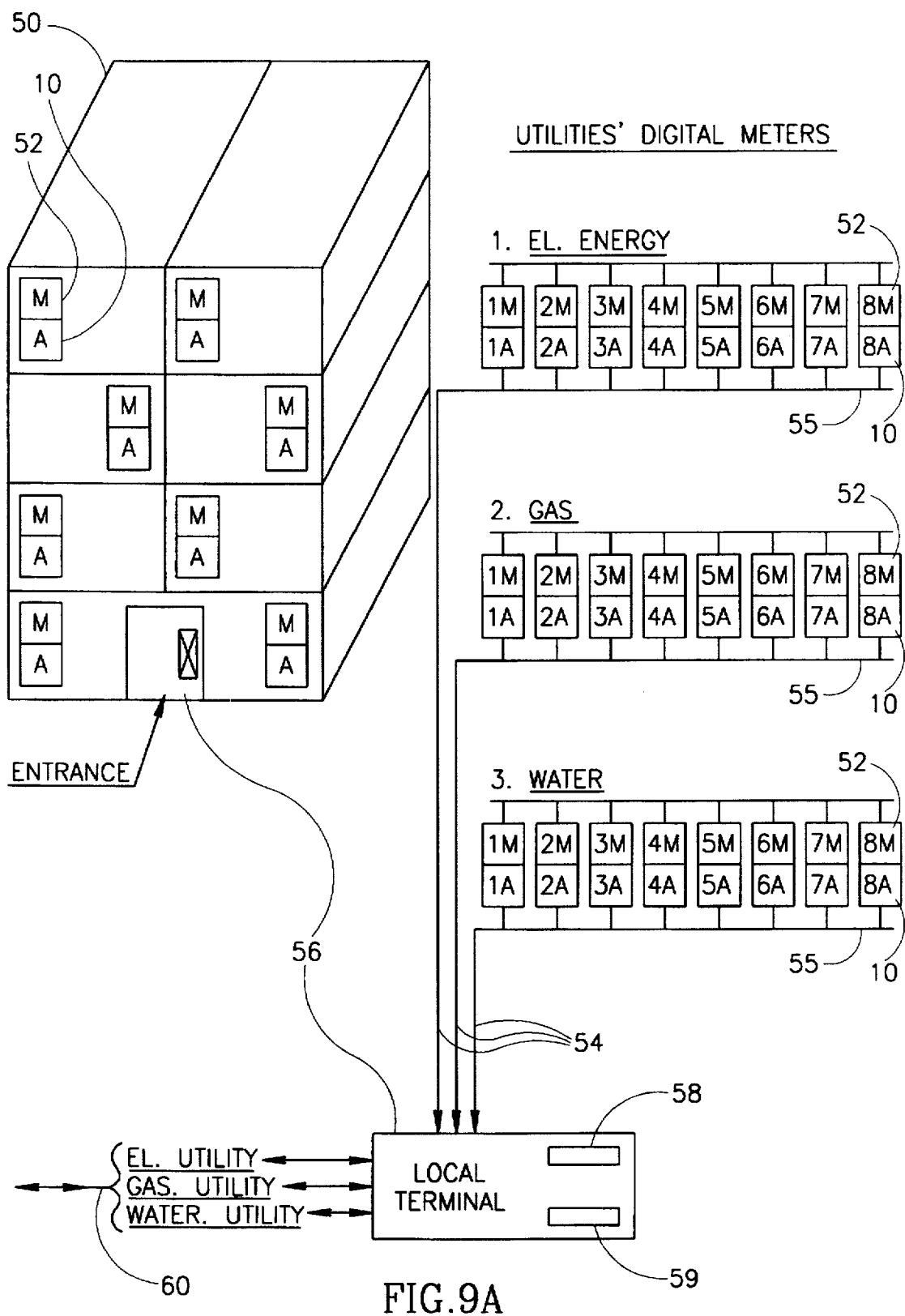
FIG. 9a–b illustrate two strategies (supply-demand) of commercial exchange in a standard flexible matrix game format, respectively, for a utility company (electric, gas, water), and for local peak-shaving in automatic control of an electric boiler.
Figure 9B:
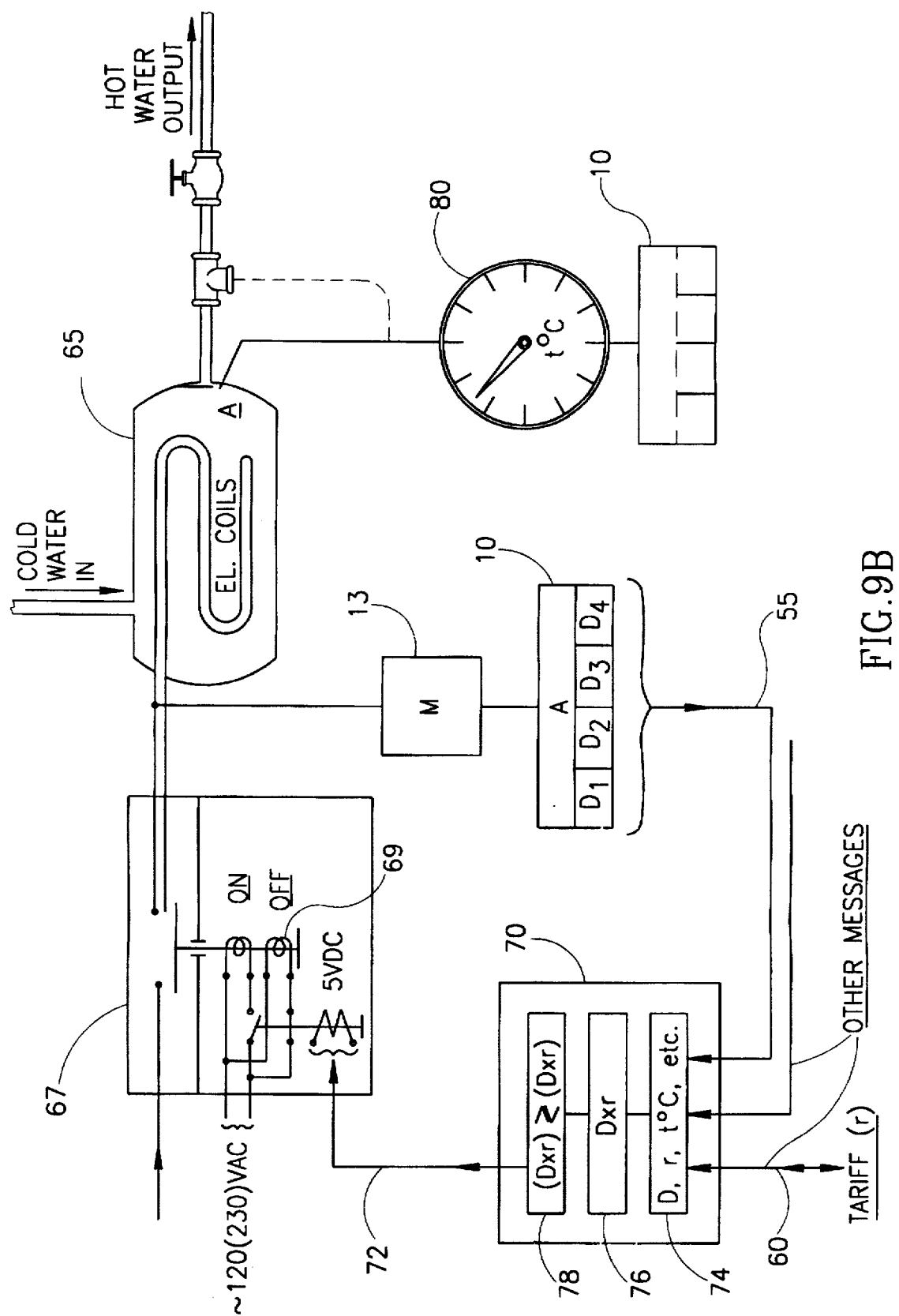

In FIGS. 9a–b, there are shown practical applications of the billing format (FIGS. 8a–b) based on the "matrix game" approach, for use in load management/decision making (FIG. 9a) or process control automation (FIG. 9b). It is necessary to underline the general application of this four-color matrix game format, in line industries with process control, planning and programming procedures in real time and object-oriented fashion (with standard resource units: kg, ton, liter, kWhr, etc.). Such applications replace artificial programming languages. The same format presents the basic flexible data which is useful as evidence in resolving utility company billing disputes.

Thus, FIGS. 8a–b present the final instrumental result for day-to-day economic practice, using a billing format based on a behavioristic model-building general TSD principle, i.e. the final result in matrix game theory, for practical commercial exchange.

FIG. 9a illustrates the automatic billing system digital track for final "matrix game" format presentation, e.g. for a residential building 50, in which individual customers/end users use the product of utilities, e.g. electricity, gas, water. In schematic form, FIG. 9a shows primary meters 52 in a dedicated connection to each distributed data coding apparatus 10. The local communication network 54 to meters 52 is connected from a local terminal 56 associated with the building. As described previously with respect to FIG. 3, each coding apparatus 10 works in automatic non-programmable fashion.

At the end of each 6-hour standard interval, the output data of coding apparatus 10, in the form of a digital-coded number 55, (e.g. kWhr) is transmitted to a local terminal 56, as a 6-hour demand (D), such that four digital-coded numbers are transmitted daily. Data processing is then done in local terminal 56, and demand and tariff rates are multiplied (D×r) and summing is performed, and periodically, each end user has a completely prepared individual bill for every product/utility resource as a four-color printout. Thus, local terminal 56 has three periodic functions:

1) individual printing of bills with "time-price signal" stated;
2) communication protocol realization in serial protocol packets,
3) data receiver for individual messages from utilities to end users. It has two slots 58, 59, one for a magnetic-strip plastic card which indicates an account number, the other for periodically printing the output in a billing format.

Serial protocol packets are transmitted on bi-directional data highway 60 from/to each local terminal 56 and every utility data center. The billing format of FIGS. 8a–b provides additional benefits for both supply and demand players, by eliminating mailing costs for billing, and by solving local billing problems in a simple, instrumental and conceptual form.

The classic "load-leveling" problem of utilities is approximately solved by the method illustrated in FIG. 9a. This problem is the source of continous attention for utility company management, due to the very costly operations associated with start-up and shut down of powerful thermal units in utility operations. According to ELECTRA-CIGRE Report No. 106 (1986). "about 70% of the reporting utilities concerned with the problem of thermal units undergo frequent start-up and shut-downs, thus, advanced methods are expected," pp. 45,49.

The most significant operating effect of the "matrix game" billing format is that it allows for a mass managerial effect, by which consumers achieve costless "load-leveling", providing formal equilibrium of supply-demand sides. Thus, every end user becomes, in dramatic fashion, an active manager in power usage payment minimization, "with a view to reduce (their) costs" as previously stated, by using the cheapest tariff rates in four 6-hour intervals daily, based on past "time-price signal" learning. In this way, millions of demand-side residential load managers are now armed with the necessary information, providing the long-awaited "advanced method" for maximal approximation in load-leveling, by virtue of a mass motivation: money saving.

At last, the most significant reserve potential is tapped for BDSM support, that of the silent majority of end users. Clearly, the FIG. 8a "matrix game" billing format is the most elegant and costless tool for load-leveling, with realization of great benefits in the form of tremendous resources and cost savings, in electric utility operating practice.

In FIG. 9b, there is illustrated a fully automatic solution for an energy-related application, using coding apparatus 10 to achieve a local peak-shaving program in heat exchange in an electric boiler 65 providing hot water, to minimize costs. Process control automation is achieved using a non-peak energy consumption program for electric boiler 65 and a simple two-position (on-off) control strategy for the operational control element in an automatic circuit breaker 67. The program has periodic activity: up to four times daily, (at the end of every 6-hour interval in 6, 12, 18 and 24 hours exactly).

Electric boiler 65 is fed with electricity via circuit breaker 67, which operates in two-position (on-off) control via a pair of coils 69, which operate via a 5 VDC relay coil. A local processor 70 feeds a final control signal 72 to the 5 VDC relay coil to operate breaker 67.

The application of FIG. 9b is based on the FIG. 8b "matrix game" approach, as shown in a typical example in the text "Process Instruments and Controls Handbook", D. Considine, 3rd Ed. (1985) McGraw Hill, at section 17.8, principles of automatic control. Using "matrix game" (FIG. 8b) every "time-price signal" is formulated in local processor 70, to generate an automatic breaker 67 trip-close signal 72. Control apparatus 10 is connected to primary digital meter 13 and periodically (four times daily) sends a demand value (D—demand-side) as a digital-coded number 55, representing the 6-hour kWhr consumption to local processor 70.

The local processor 70 includes three elements, a buffer 74, a multiplier 76 and a comparator 78. Buffer 74 accepts the 6-hour tariff rate (r—supply-side) on data highway 60 from the utility data center (not shown), and feeds it to multiplier 76, which produces a "time-price signal" (TPS) value (D×r), and then comparator 78 compares the previous and current time-price signals (e.g. 1D1×r1 ≧1D2×r2, etc.). Comparator 78 works at the end of every previous 6-hour demand interval (6, 12, 18 and 24 hrs). Four times a day, every TPS (D×r) value for the 6-hour interval is compared with the next TPS value.

Thus, the peak-shaving seasonal program can be realized in a fully automatic fashion, for example, for the typical load profile of an electric utility (white/morning and rose/evening peak-shaving, as part of a general load-leveling problem. For other seasons with other tariff rates (r1, r2, r3, r4) such an automation software program can be prepared in preliminary fashion in "matrix game" standard format (FIG. 8b).

For the FIG. 9b example, the values are: electric boiler power: p=10 kW ; D=60 kWhr; tariff rates: r1=10 cents ; r2=15c ; r3=12c ; r4=20c. The "matrix game" for the time-price signal follows:

| Calendar dates | files rates (r) cents/kWhr | 1/blue 10 | 2/white 15 | 3/gray 12 | 4/rose 20 |
| --- | --- | --- | --- | --- | --- |
| 1 day | D × r | 60 × 10 = | 60 × 15 = | 60 × 12 = | 60 × 20 = |
| 2 day | (TPS) | 600 | 900 | 720 | 1200 |

In other seasons, different tariff rates will apply. Following is the (winter) software algorithm for generating "trip-close" signal via final control signal 72:

1) previous blue TPS<future white TPS (600<900); breaker 67 trips at 6 AM via final control signal 72.
2) previous white TPS>future gray TPS (900>720); breaker 67 closes at 12 PM via final control signal 72.
3) previous gray TPS<future rose TPS (720<1200); breaker 67 trips at 18 PM via final control signal 72.
4) previous rose TPS>future blue TPS (1200>600); breaker 67 closes at 24 AM via final control signal 72.

As seen from the above, the control rule for producing final control signal 72 is a comparison of previous and future TPS values: if previous TPS<future TPS, "trip", if previous TPS>future TPS, "close".

The operation of the FIG. 9b example depends on the consumption of electricity to heat the daily electric boiler capacity. FIG. 9b demonstrates a possible source of feedback using digital thermometer 80 and dedicated coding apparatus 10 for analog variables.

The model of peak-shaving shown in FIG. 9b can be used in other facilities, with large heating and cooling systems (refrigerator, air conditioning, compressors), and the same two-position control automation technique can be used in a more sophisticated modification for use with existing residential thermostats, to provide cost savings.

Figure 10A:
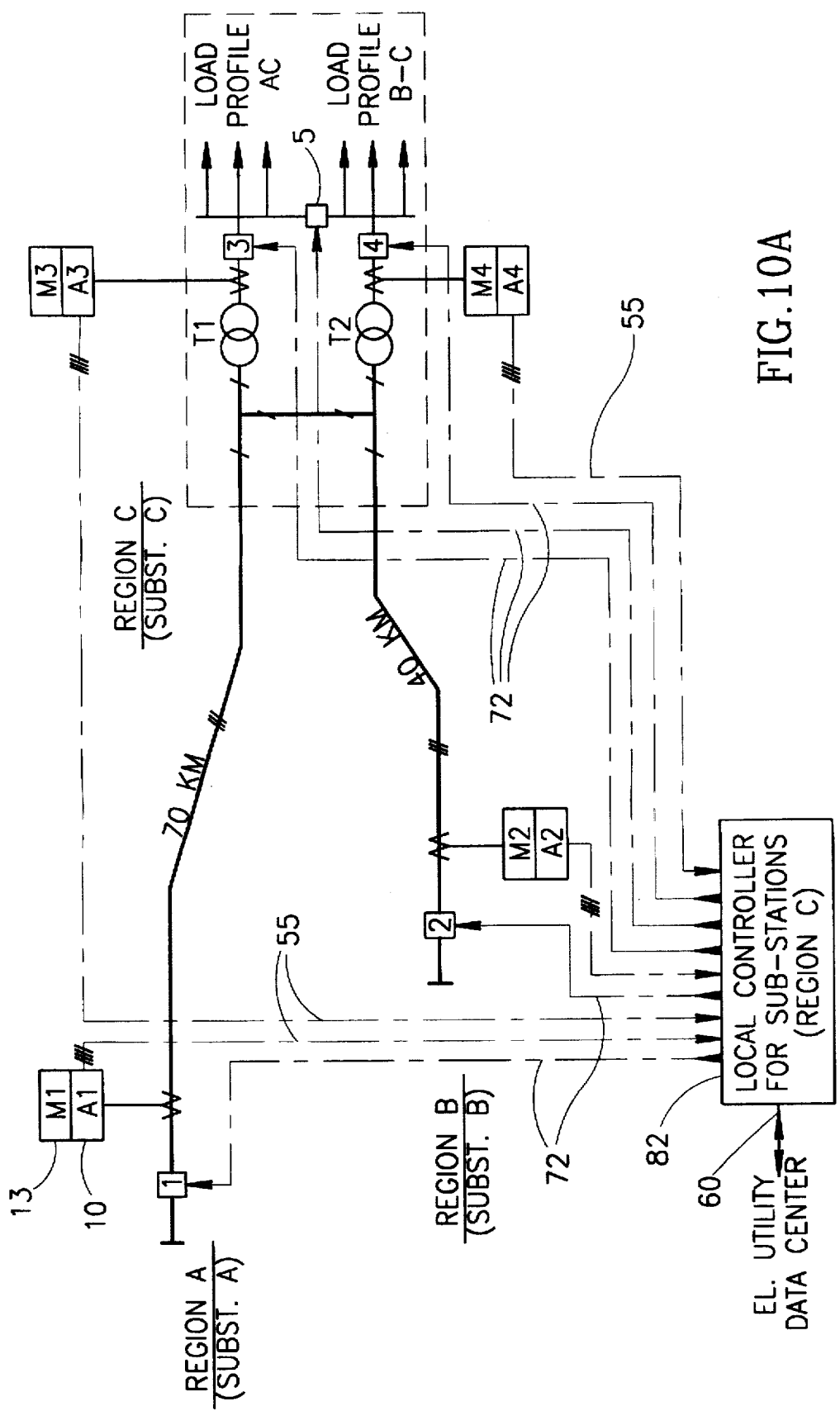
FIGS. 10a–c illustrate long-distance electrical energy transmission losses minimization via process control automation.

FIG. 10a illustrates a typical one-line diagram of an electrical utility T&D network, which can be used to illustrate a method for minimization of transmission losses in long-distance electrical energy transmission, via two-position control automation, using the standard behavioristic TSD principle, as applied in FIG. 9b. FIG. 10a is the simplest case involving use of inventive coding apparatus 10 for transmission loss control.

In a recent text about environmental problems, it has been noted regarding energy transmission losses that "the amount of energy lost in the transmission of electricity from one location to another is so large as to make long-distance transport extremely inefficient", "Earth in the Balance", A. Gore, Houghton Mifflin (1992), p. 330.

Indeed, this problem cost the US power industry no less than 3% of sales (approx. $5.5 billion annually). In current practice, this problem has not been adequately solved because of the software gap resulting from the impossibility of simultaneous and coherent comparison of metering data (kWhrs) at different long-distance control points (having automatic HV breakers) within coherent load intervals, such as peak-peak, offpeak-offpeak, etc.

This classic task has only been addressed by a paper solution, and "most of the utilities schedule generation neglecting transmission losses", according to ELECTRA-CIGRE Report No. 106 (1986), p. 75. This undesirable circumstance causes tariff rates to include useless electric utility costs.

In FIG. 10a, regions A and B have two overhead HV lines (70 km and 40 km) which represent electric supply of region C via a substation with two transformers T1, T2, and two different daily load profiles, AC and BC. In normal topology, each power/transmission block (PTB—AC and BC) line-transformer works separately, and they can be connected and disconnected via bus breaker 5, which is normally open. Each PTB AC and BC has two primary digital meters 13 (M1–M3, M2–M4) measuring energy (kWhr) transmitted via each automatic circuit breaker (1,3 and 2,4). Each primary digital meter 13 is connected in dedicated fashion to coding apparatus 10 (represented by A1, A2, A3 and A4), each of which operates simultaneously by sending four digital-coded numbers (kWhrs) 55 daily as simultaneous control data messages to local controller 82, e.g., located in the substation for region C. Additionally, discrete analog signal measurement of the voltage level is useful.

The local controller 82 provides discrete data storage and discrete manipulation, according to the TSD principle, including receipt of control messages 55, subtraction, addition, comparison and production of periodic final control signals 72 for transmission to breakers 1–5, and for transmission of communication protocol packets related to the utility operation using a common or advanced carrier such as fiber-optic cable for data highway 60.

Figure 10B:
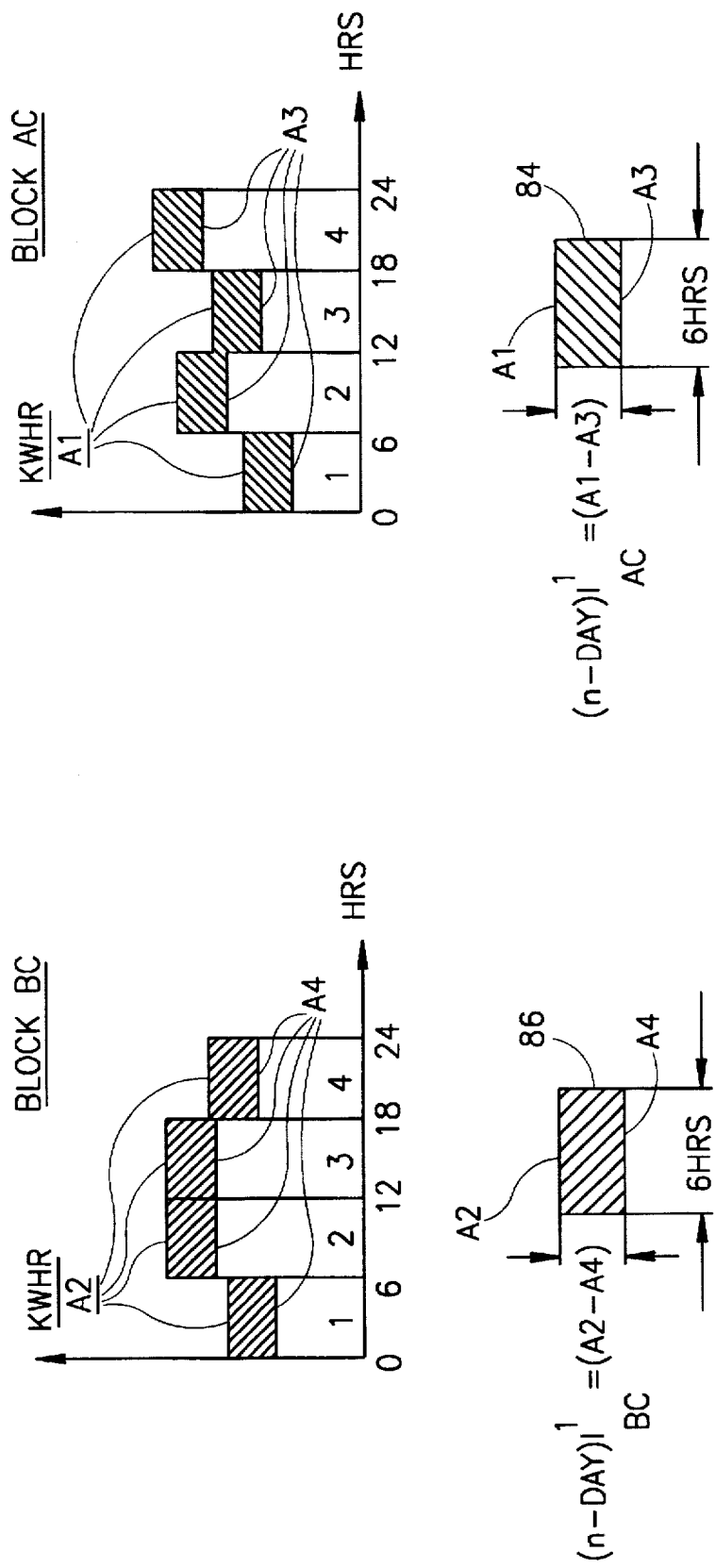

As shown in FIG. 10b, every shaded area on graph represents a 6-hour transmission loss value for PTB AC and BC. Discrete, coherent, simultaneous output data from coding apparatus A1–A4 provides an automatic basis for loss calculation and minimization. For example, area 84 represents the difference in output data betweeen A1 and A3, and gives the loss value ($l_{AC}^n$) for PTB AC, and area 86 represents the difference between A2 and A4, and gives the loss value ($l_{BC}^n$) for PTB BC. These loss values (kWhr) are coherently and simultaneously compared (blue-blue, white—white etc.) for every 6-hour interval (n=1–4 intervals) exactly at 6, 12, 18, 24 hrs. by a software control program in local controller 82 to provide final control signals 72.

Figure 10C:
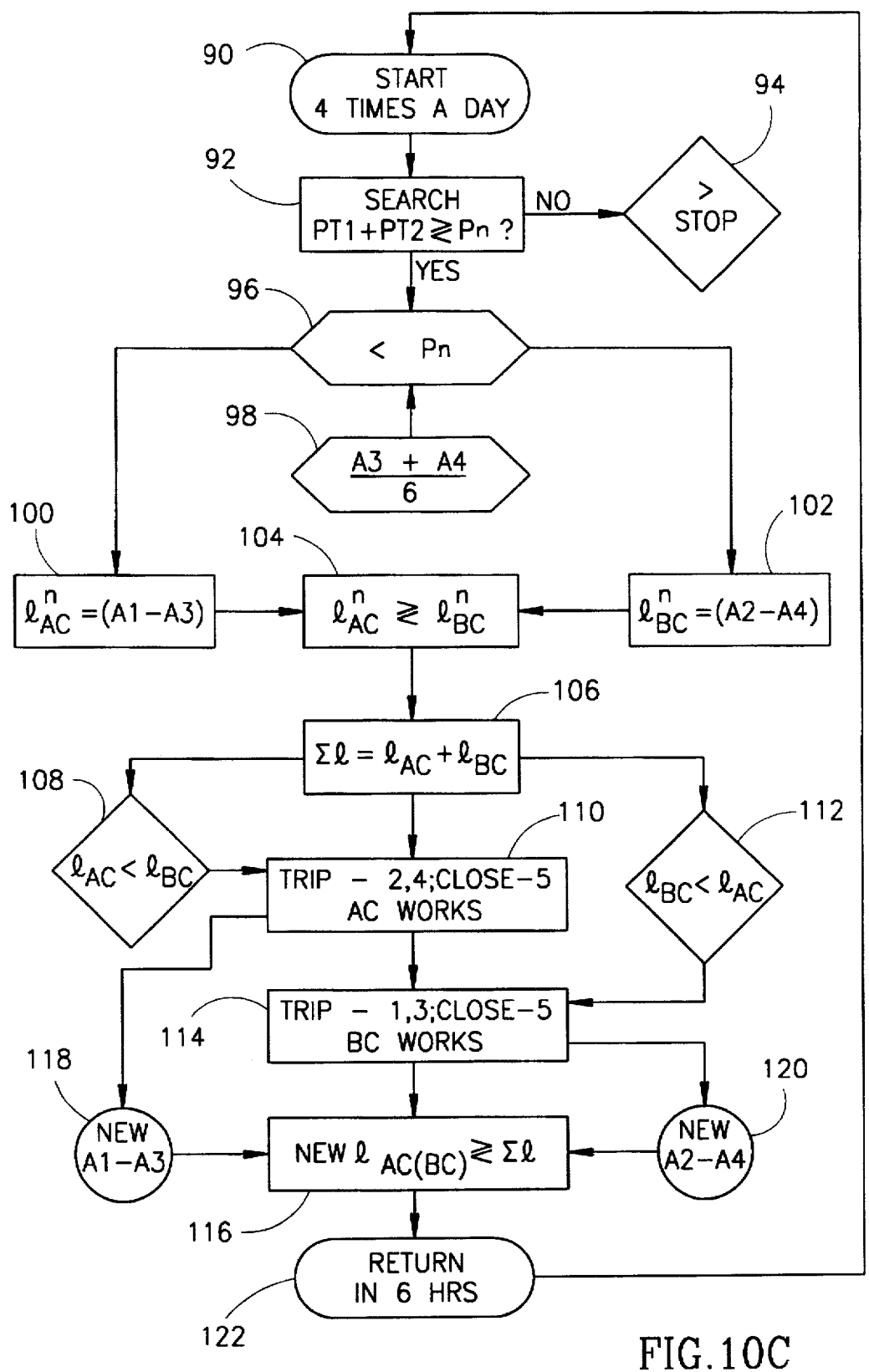

FIG. 10c presents a software flowchart describing the operation of local controller 82 during manipulation of output data from coding apparatus A1–A4. In block 90, operation begins at the end of each 6-hour interval, and in block 92 a calculation is made to determine if PT1+PT2 $\geq$ PN, where PT1 and PT2 are the current average load of transformers T1, T2 during previous 6-hour intervals for past days, and PN is the nominal power of T1 or T2. If the current average load exceeds PN, in block 94, operation is halted.

Block 96 checks to see if the current average load over 6 hours for PTB AC and BC is less than PN, by performing a calculation in block 98, using the sum from coding apparatus A3 and A4. If the current average load is less than PN, block 96 transfers control to blocks 100 and 102 which perform loss calculation for each of PTB AC and BC, using coherent data from coding apparatus A1–A4 (blue—blue, etc.). The loss calculations are compared in block 104, and are summed in block 106. In block 108, a comparison is made and if $l_{AC}{}^n < l_{BC}{}^n$ then local controller 82 produces, in block 110, a control signal to cause tripping of breakers 2, 4 and closing of bus breaker 5. Thus, PTB BC is disconnected, and PTB AC operates.

If, however, the comparison is made in block 112 and $l_{BC}{}^n < l_{AC}{}^n$, then local controller 82 produces, in block 114, a control signal to cause tripping of breakers 1, 3 and closing of bus breaker 5. Thus, PTB AC is disconnected, and PTB BC operates.

The post-solution/$^{logic}$ manipulation is a comparison, in block 116, of the pre-solution transmission losses calculated in block 106, (sum of both PTB AC and BC transmission losses), with the post-solution new transmission losses in operating PTB AC or BC (blocks 118 or 120). The rule: new losses must be less than previous sum. This step adds a new control function to augment feedforward control capabilities. The certain, past knowledge of the process is the true automation base for efficient control of long-distance transmission of power resources. The result in FIG. 10a is that new losses in each PTB (AC or BC) are less than the previous sum for two PTBs (AC and BC) in the coherent (blue-blue) 6-hour intervals selected according to the software of FIG. 10c.

After the post-solution manipulation of block 116, block 122 returns control to start block 90 for the next 6-hour interval.

For example, a possible solution for a given day is:

| | |
|---|---|
| blue (offpeak) interval | breakers 2, 4 and 5 are closed and 1, 3 are in trip position |
| white (morning peak) interval | breakers 1, 3 and 2, 4 are closed and 5 is in normal trip position |
| gray (midpeak) interval | breakers 1, 3 and 5 are closed and 2, 4 are in trip position |
| rose (peak) interval | breakers 1, 3 and 2, 4 are closed and 5 is in normal trip position |

The application of this elegant engineering solution can be achieved in many other industries where resources are transmitted over long distances and primary metering data is available, such as in the case of gas, liquid fuel, water chemical matter. The solution has favorably environmental and ecological consequences, since it reduces the waste of resources.

Figure 11:
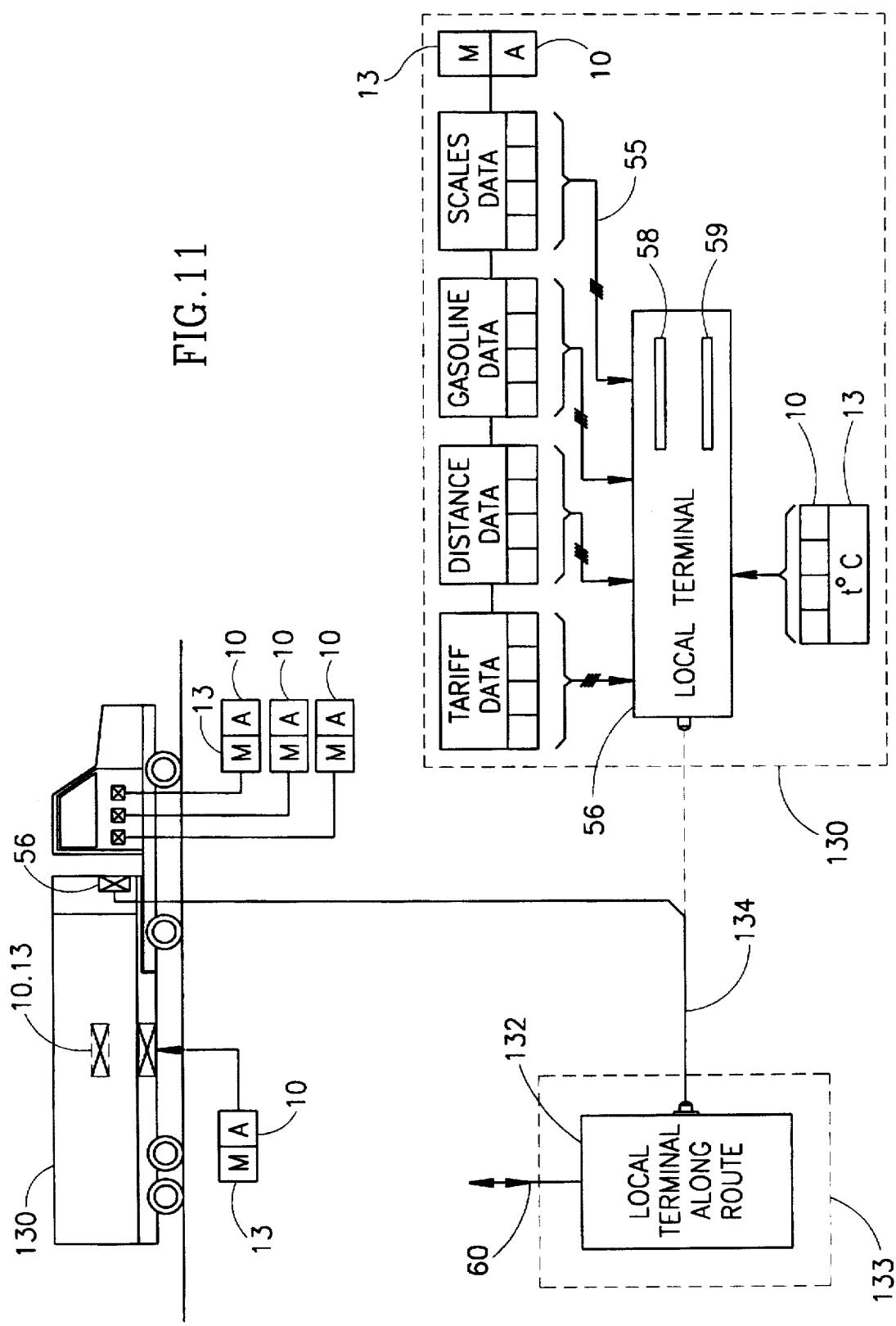
FIG. 11 illustrates a standard communication protocol of current resources, for optimal control, management and planning purposes in the cargo transportation field.

FIG. 11 illustrates schematically an application of process control and planning in the cargo transportation field (civilian and military) using the behavioristic standard protocol of the present invention. Cargo truck 130 is provided with primary metering instrumentation 13 which is connected in dedicated fashion to coding apparatus 10 and local terminal 56 asssociated with the truck. Digital-coded numbers 55 are provided in the form of control data messages to local terminal 56. Data from cargo truck 130 in the form of resource behavioristic flexible data (distance, gasoline, weight, etc.) is accumulated and presented in accordance with FIGS. 3–5. Local terminal 56 has two slots, for local data output, a slot 58 for use with an magnetic-strip plastic card, and a slot 59 for colored printout of local data.

For strategic management and planning, the data available in cargo truck 130 can be sent in standard protocol packets via local terminals 132 located at gas stations 133 along the truck route, which are connected via bi-directional highway 60 to the fleet data center (not shown). A short cable 134 can be used to download from cargo truck 130 to local terminal 132.

As described in FIGS. 6a–b, two classic programming methods are sufficient for optimization procedures: linear regression and linear programmming only. Using the discrete approach of the TSD principle, a significant computing advantage is achieved, since less iterations are required, saving computing time.

In accordance with the process control application of FIG. 11, cargo transport optimization procedures can be achieved by use of a flexible protocol system in the "matrix game" format (FIGS. 8a–b), and flexible planning charts, e.g., critical path method (CPM) for optimal route planning, (Handbook of Budgeting, Sweeny et al., John Wiley and Sons (1987) 2nd ed., pp. 561–571), and flexible budgeting. All of these provide essential resources and cost savings in the cargo transportation field.

Having described the invention with regard to certain specific embodiments, it is to be understood that the description is not meant as a limitation since further modifications may now become apparent to those skilled in the art and it is intended to cover such modifications as fall within the scope of the appended claims.

I claim:

1. A method for periodically, automatically controlling a process in accordance with digital control signals produced as output by a non-programmable controller, wherein the non-programmable controller is responsive to behavioristic-format coded input data supplied by a non-programmable coding apparatus which acquires raw, quantitative resource data measured by primary instrumentation, said method comprising the steps of:

defining, in said coding apparatus, four 6-hour time intervals corresponding to periods of a 24-hour calendar day;

inputting the instrumentation-measured raw, quantitative resource data as discrete digital values into a summing means in said coding apparatus;

disjointly summing said discrete digital values of the raw, instrumentation-measured quantitative resource data occurring during said intervals;

storing said summed discrete digital values of quantitative resource data associated with each of said defined four 6-hour time intervals, as four digital-coded numbers a day;

providing said four digital-coded numbers to said controller for producing, via arithmetic and logic manipulation, said digital control signals; and performing periodic automatic process control in accordance with said digital control signals, wherein said storing step is performed by subdividing the calendar day to produce said four digital-coded numbers, each associated with one of four daily intervals defined by the following hourly intervals:

| | |
|---|---|
| 00:01–06:00 | (night); |
| 06:01–12:00 | (morning); |
| 12:01–18:00 | (day); and |
| 18:01–24:00 | (evening); | and wherein said four digital-coded numbers comprise a rectangular matrix, each digital-coded number corresponding to one of said four 6-hour daily intervals, said rectangular matrix defining a standard analytical format for process control and object-oriented linear programming and regression optimization procedures.

2. The method of claim 1 wherein said rectangular matrix provides a matrix game billing format for two-sided supply and demand decision-making applied to energy consumption optimization, providing commercial equilibrium billing format realization.

3. The method of claim 1 wherein said digital-coded numbers are applied to electrical energy transmission loss minimization in accordance with a method comprising the steps of:
 comparing a first and second load level over a 6-hour interval, said first load level being associated with a first transmission line, and said second load level being associated with a second transmission line;
 calculating simultaneous, coherent losses associated with each of said first and second load levels;
 comparing said calculated losses at the end of said 6-hour interval; and
 disconnecting one of said first and second transmisiion lines,
 wherein said first transmission line is disconnected if said losses associated with said first load level exceed said losses associated with said second load level, and wherein said second transmission line is disconnected if said losses associated with said second load level exceed said losses associated with said first load level.

4. The method of claim 1 further comprising the step of providing said digital-coded numbers for printing said stored, discrete summed quantitative resource data in four colors.

5. The method of claim 1 further comprising the step of transferring said digital-coded numbers containing said discrete, summed digital values of quantitative resource data over a data highway in a distributed automation protocol to at least one computing station for performing automatic process control, discrete optimization and decision-making.

6. The method of claim 1 wherein said step of providing said digital-coded numbers for producing said digital control signals comprises arithimetic and logic manipulation including summing, subdividing, multiplying, and comparing steps.

7. A dedicated non-programmable coding apparatus for providing behavioristic-format coded output data using input raw, quantitative resource data measured by primary instrumentation, said apparatus comprising:
 timing means for defining four 6-hour time intervals corresponding to periods of a 24-hour calendar day;
 summing means for disjointly summing discrete digital values of the raw, instrumentation-measured quantitative resource data occurring during said time intervals;
 storage means for storing said summed discrete digital values of quantitative resource data associated with each of said defined four 6-hour time intervals, as four digital-coded numbers; and
 means for transferring said digital-coded numbers as time history files containing said discrete, summed digital values of quantitative resource data over a data highway in a distributed automation protocol to at least one computing station for performing periodic, automatic process control, discrete optimization and decision-making, wherein said timing means subdivides the calendar day to produce said four digital-coded numbers, each associated with one of four daily intervals defined by the following hourly intervals:

| | |
|---|---|
| 00:01–06:00 | (night); |
| 06:01–12:00 | (morning); |
| 12:01–18:00 | (day); and |
| 18:01–24:00 | (evening); | and wherein said four digital-coded numbers comprise a rectangular matrix, each digital-coded number corresponding to one of said four 6-hour daily intervals, said rectangular matrix defining a standard analytical format for process control and object-oriented linear programming and regression optimization procedures.

8. The coding apparatus of claim 7 wherein said four digital-coded numbers comprise a rectangular matrix containing four group coded values each corresponding to one of said four 6-hour daily intervals, said rectangular matrix defining a standard format for process control automation and object-oriented linear programming and regression optimization procedures.

9. The coding apparatus of claim 7 further comprising means for color-format printing of said time history files.

10. The coding apparatus of claim 7 wherein said quantitative resource data is provided by the primary instrumentation in digital form.

11. The coding apparatus of claim 7 wherein said timing means, summing means and storage means compromise a microprocessor-based quantitative resource data controller.

12. A dedicated nonprogrammable coding apparatus for automatically coding measured quantitative resource data provided by primary instrumentation, said apparatus comprising:
 timing means for defining four 6-hour time intervals corresponding to periods of a 24-hour calendar day;
 summing means for disjointly summing discrete digital values of the raw, instrumentation-measured quantitative resource data occurring during said time intervals;
 storage means for storing said summed discrete digital values of quantitative resource data associated with each of said defined four 6-hour time intervals, as four time history files; and
 means for color-format printing said stored, summed discrete digital values of quantitative resource data in said associated one of said four time history files,
 wherein said four time history files comprise a rectangular matrix containing four group coded values corresponding to said four 6-hour daily intervals, said rectangular matrix defining a standard format for periodic process control automation and object-oriented linear programming and regression optimization procedures,
 wherein said timing means subdivides the calendar day to produce said four digital-coded numbers, each associated with one of four daily intervals defined by the following hourly intervals:

| | | |
|---|---|---|
| 00:01–06:00 | (night): | |
| 06:01–12:00 | (morning); | |
| 12:01–18:00 | (day); and | |
| 18:01–24:00 | (evening); | | and wherein said four digital-coded numbers comprise a rectangular matrix, each digital-coded number corresponding to one of said four 6-hour daily intervals, said rectangular matrix defining a standard analytical format for process control and object-oriented linear programming and regression optimization procedures.

* * * * *